(12) United States Patent
Cocquelin et al.

(10) Patent No.: US 9,424,483 B2
(45) Date of Patent: Aug. 23, 2016

(54) METHOD AND DEVICE FOR MEASURING THE VERTICALITY OF A CONTAINER

(71) Applicant: MSC & SGCC, Vourles (FR)

(72) Inventors: Benjamin Cocquelin, Villeurbanne (FR); Ghislain Mace, Vaulx-Milieu (FR); Alexandre Eggenspieler, Saint-Martin la Plaine (FR)

(73) Assignee: MSC & SGCC, Vourles (FR)

( * ) Notice: Subject to any disclaimer, the term of this patent is extended or adjusted under 35 U.S.C. 154(b) by 0 days.

(21) Appl. No.: 14/653,332

(22) PCT Filed: Dec. 17, 2013

(86) PCT No.: PCT/FR2013/053129
§ 371 (c)(1),
(2) Date: Jun. 18, 2015

(87) PCT Pub. No.: WO2014/096680
PCT Pub. Date: Jun. 26, 2014

(65) Prior Publication Data
US 2016/0012305 A1    Jan. 14, 2016

(30) Foreign Application Priority Data

Dec. 20, 2012 (FR) ...................................... 12 62382

(51) Int. Cl.
| | | |
|---|---|---|
| *G06K 9/48* | (2006.01) | |
| *G06K 9/46* | (2006.01) | |
| *B07C 5/10* | (2006.01) | |
| *G01B 11/26* | (2006.01) | |
| *G01B 11/00* | (2006.01) | |
| *G06T 7/00* | (2006.01) | |

(52) U.S. Cl.
CPC ................ *G06K 9/4604* (2013.01); *B07C 5/10* (2013.01); *G01B 11/002* (2013.01); *G01B 11/26* (2013.01); *G06T 7/0083* (2013.01); *G06T 7/0085* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 4,433,785 A | 2/1984 | Riggs et al. | |
| 4,500,203 A | 2/1985 | Bieringer | |
| 6,025,910 A | 2/2000 | Lucas | |
| 6,212,962 B1 | 4/2001 | Lucas | |
| 7,010,863 B1 * | 3/2006 | Juvinall | G01B 11/26 33/522 |
| 2011/0141265 A1 * | 6/2011 | Holtkamp | G01J 5/0003 348/86 |

FOREIGN PATENT DOCUMENTS

| | | |
|---|---|---|
| EP | 0 341 849 | 11/1989 |
| FR | 2 973 501 | 10/2012 |
| WO | 2012/042582 | 4/2012 |

* cited by examiner

*Primary Examiner* — Stephen R Koziol
*Assistant Examiner* — Amandeep Saini
(74) *Attorney, Agent, or Firm* — Clark & Brody

(57) ABSTRACT

A method of measuring lean on a container driven in rotation comprises:
taking at least one image of the container to obtain images of the left and right edges of the ring, the matrix images of the left and right edges of the heel, of the shoulder, and/or of the base of the neck;
analyzing the images of the left and right edges of the ring to determine the real position of the ring; and the matrix images of the left and right edges to determine a left positioning point Tg and right positioning point Td; and
determining the theoretical position of the ring on a perpendicular to the straight line segment passing through the left and right positioning points; and based on variations in the differences between the real position and the theoretical position of the ring, deducing a measurement of the lean of the container.

16 Claims, 5 Drawing Sheets

METHOD AND DEVICE FOR MEASURING THE VERTICALITY OF A CONTAINER

The present invention relates to the technical field of inspecting hollow articles or containers in the general sense, such as for example bottles, pots, vials, in particular glass vials, for the purpose of measuring the lean of such containers.

In the technical field of inspecting containers, and in particular containers made of glass such as bottles, there is a need to measure the lean of containers in order in particular to guarantee that they can be filled or packaged. It should be observed that in the state of the prior art, the lean of a container is expressed in various ways. For example, the lean of a container may be expressed in the form of an angle or of a degree of inclination. It is also known to express lean as the difference between the center of the bottom of the container and the center of a cross-section of the container taken at a selected height up the container, e.g. at its ring. Instead of taking account of the difference between the centers of two sections of the container, it is also possible for lean to be considered as being a measurement of the radial excursion over one revolution of a point of the container taken at a height under consideration of the container.

Whatever the way in which lean is expressed, measuring the lean of a container gives important information about the dimensional characteristics of the container, e.g. making it possible to determine that it has a lean defect when the measurement exceeds a reference value. In the prior art, numerous technical solutions have been proposed for measuring the lean of bottles.

For example, U.S. Pat. No. 4,433,785 describes a detector system having two freely-rotatable wheels in contact with the bottom of the bottle. While the container is rotating in an inspection station, vertical movements of the wheels are measured by means of electromagnetic position sensors. Such a system is not adapted to making inspections at a high rate because of the risk of losing contact between the freely-rotating wheels and the bottoms of the bottles. Furthermore, such a system cannot give an accurate measurement, and it presents a manifest risk of suffering wear. In more fundamental manner, that system measures only the movements of the bottom of the bottle relative to the axis of rotation as imposed by the inspection station. Thus, when the container presents deformation in its body, for example, it no longer rotates about its axis of symmetry, so the measurement of its lean is falsified.

U.S. Pat. No. 7,010,863 describes another technique that consists in replacing the two freely-rotatable wheels with two optical measurement sensors enabling light to be directed at two points of the bottom of the bottle while it is standing on a support surface. Using the light reflected by the bottle and the rotation of the bottle, it is possible to determine the difference between the support plane and a plane perpendicular to the axis of rotation, and a lean defect can be deduced therefrom. Such a device makes it possible to eliminate the drawbacks associated with the use of freely-rotatable wheels. Nevertheless, the measuring principle of such a device relies on the assumption that the container is perfect in all aspects with the exception of its bottom, which is inclined. That assumption leads to considering that the central axis of the container coincides with the axis of rotation of the inspection station so that a measurement of the movements of the bottom of the container is sufficient. Unfortunately, in practice, the axis of the container does not coincide with the axis of rotation of the inspection station. Thus, the prior technique does not make it possible to obtain a real measurement of the lean of a container. In additional manner, known prior solutions do not make it possible to measure the lean of the necks of such containers.

Patent application EP 0 341 849 describes a method of measuring the profile and the lean of a container having a bottom from which there rises a vertical wall. The container is placed freely on a support surface that is controlled in rotation in order to take measurements over the entire periphery of the container. The support surface of the container serves as a reference plane for measuring lean. Unfortunately, in the field of industrial measurement, measurements of lean performed using a reference taken from the handling system are not reliable. This applies in particular to measuring the lean of containers on a rotating station situated in a manufacturing line. Such a rotating inspection station has a support surface for the container and a system for causing the container to rotate, which system is made up of a rotary drive wheel for driving the container, which container is pressed against two abutments while it is rotating. The axis of rotation of the container varies continuously, so its movement is random and unpredictable. Furthermore, it is found to be impossible to place the bottom of the container in the reference plane constituted by the support surface given, in particular: the non-circular sections of containers (which may be ovalized or have flats), the possible presence of flawed bottoms, of deformations of the container, and of defects affecting the system for driving the container in rotation.

Document FR 2 973 501 describes a device for measuring the lean of containers. When the container is caused to rotate, the positions of measurement points on the bottom of the container are measured. The measurements taken by such a device are not completely correct because during rotation of the containers, no account is taken of potential lateral movements of the bottoms of containers.

U.S. Pat. No. 6,212,962 also describes a device for inspecting containers traveling in translation, the device being intended in particular to determine the inclination of container bodies relative to the bottoms of those containers. By way of example, such a device cannot detect a lean defect in the event of an article presenting deformation in its wall at the height on which a measurement was taken on a reference article. Thus, an indentation, a flat, or ovalization at a given height leads in erroneous manner to an article being considered as being inclined.

Patent application WO 2012/042582 describes a device for inspecting glass bottles that seeks to check accurately the obliquity of the top surface of the mouths of bottles. A system for imaging the mouth of the bottle serves to detect in an image of the mouth two points that are situated on the top surface of the mouth of the bottle. Simultaneously, two points situated at the bottom end of the bottle are detected in an image of the insweep as taken with an insweep imager system. The inclination of the two points of the insweep serves to compensate for the inclination of the two points of the mouth, thereby enabling the top obliquity of the bottle to be calculated and consequently serving to inspect the obliquity of the top surface of the mouth of the bottle. Such a device is not suitable for measuring a lean defect of a bottle since that is a defect in the shape of the body or in the shape of the neck of the bottle and does not require knowledge of the inclination of the surface of the ring of a bottle.

Document US 2011/141265 describes a method of inspecting the quality of containers leaving a forming machine. Since the containers are still hot, they are not strong enough to be handled to make them rotate. It is clear that rotation makes it possible using a small number of sensors to obtain a large number of images, thereby contributing to accuracy.

Furthermore, that method takes images of the container making it possible, after processing, to determine the opposite lateral edges of the container. That method acts along horizontal lines distributed along the height of the container, to determine the middles of the opposite edges of the container, and it then determines straight line segments passing through said middles, and it considers as a measurement of lean the angles of those segments relative to the vertical, i.e. relative to the conveyor in FIGS. 18 to 21. The proposed measurement of lean is inaccurate since it does not take account of the genuine verticality of the body or of the neck that should ideally be taken relative to the bottom of the container. In that method, the position of the bottom is assumed to be identical to the position of the conveyor, which is erroneous.

Likewise, U.S. Pat. No. 6,025,910 describes a technique for inspecting bottles traveling in translation past an inspection station seeking to take successive images of each container in order to analyze them so as to determine in particular the lean of the bottle. That patent presents the same drawbacks as the devices described in Documents U.S. Pat. No. 6,212,962 and WO 2012/042582, since that patent does not take account of the shape of the body or of the neck of the bottles.

The present invention thus seeks to remedy the drawbacks of the state of the art by proposing a novel technique for measuring the real lean presented by containers, these measurements being performed on the manufacturing line by using a rotary station so as to enable measurements to be taken over the entire periphery of each container.

In order to achieve such an object, the invention proposes a method of measuring lean on a container standing on a support surface and presenting a ring and a bottom from which there rises a vertical wall connected to the bottom by a heel, the vertical wall presenting a neck that is optionally provided at its base with a shoulder, and the method consisting in:
 causing the container to revolve about a vertical axis close to the axis of symmetry of the article;
 placing at least one camera on one side of the container to deliver a sequence of images of the container over at least half a revolution, the camera having at optical observation axis that is substantially orthogonal to the vertical axis of the container, with a lateral field that extends in a transverse direction orthogonal to the vertical axis and to the optical axis.

According to the invention, the method further consists in:
 defining a real height for the container;
 for each increment in rotation of the container through at least half a revolution:
  taking at least one image of the container so as to obtain an image of the left edge of the ring, an image of the right edge of the ring, a matrix image of the left edge of the heel, of the shoulder, and/or of the base of the neck, and a matrix image of the right edge of the heel, of the shoulder, and/or of the base of the neck;
  analyzing:
   the images of the left and right edges of the ring in order to determine at least the coordinate in the transverse direction of the real position of the ring;
   the matrix image of the left edge in order to determine the coordinates in the transverse and vertical directions of a left positioning point Tg; and
   the matrix image of the right edge in order to determine the coordinates in the transverse and vertical directions of a right positioning point Td; and
  determining at least the coordinate in the transverse direction of a theoretical position of the ring on a perpendicular to the straight line segment passing through the left and right positioning points at the real height of the container taken from this straight line segment; and
 on the basis of variations in the transverse direction of the coordinates of the real position of the ring and of the theoretical position of the ring, taken into consideration over at least half a revolution of the container, deducing a measurement for the lean of the container from their maximum difference.

Furthermore, the method of the invention also includes in combination at least one and/or another of the following additional characteristics:
 taking as left and right matrix images, matrix images of the heel, of the shoulder, and/or of the base of the neck in order to measure the lean of the neck of the container, of the body of the container, and/or its total lean;
 for each increment in rotation, the real position of the ring is determined by analyzing a linear or matrix image containing the entire ring in the transverse direction, in determining the respective positions of the right and left edges of the ring, and by calculating a point that depends on the two edges;
 for each container:
  characterizing the initial positions and shapes of the left and right edges of the container in the left and right matrix images respectively taken during rotation of the container; and
  searching, respectively in each of the following left and right matrix images taken during rotation of the container for the shapes respectively of the left and right edges of the container as characterized in the first image in order to determine the left and right positioning points;
 determining the left and right positioning points in the initial image by selecting them to be symmetrical about the axis of symmetry of the container, and by spacing them apart at a distance of the same order as the diameter of the support surface or of the container;
 determining the left and right positioning points in the initial image by selecting them so as to situate them in the support surface;
 characterizing the shape of the right and left edges of the container by at least the outlines of the container that appear in the matrix image as described by sets of points and/or of segments and/or curved portions, and in that it consists in searching at least for the outline characterized in the first image in each of the following images, by attempting to superpose at least said outline on the outline present in each following image by using operations of translation and/or of rotation;
 for each type of container, determining the distance of the theoretical position of the ring relative to the straight line segment from a determined constant or measurement; and
 taking a left edge image and a right edge image including viewing the top edge of the container in order to determine the height of the container.

The invention also provides a device for measuring lean of a container presenting a ring and a bottom from which there rises a vertical wall connected to the bottom by a heel, the vertical wall presenting a neck that is optionally provided at its base with a shoulder, the device comprising:
 a system for causing the container to revolve about its vertical axis of symmetry;
 at least one camera arranged on one side of the container and delivering sequences of images of the container over at least half a revolution, and having an optical observation axis that is substantially orthogonal to the axis of rotation of the container, with a lateral field that extends in a direction orthogonal to the vertical axis of symmetry of the optical axis;

a storage unit for storing image sequences of containers; and a unit for analyzing images and image sequences supplied at least by the camera, and connected to the storage unit.

According to the invention, for each increment in angle at least one camera takes at least one image of the left and right edges of the ring, the left matrix image of the heel, of the shoulder, and/or to the base of the neck, and the right matrix image of the heel, of the shoulder, and/or of the base of the neck of the article;

the processor unit serves to:

analyze:

the images of the left and right edges of the ring in order to determine at least the coordinate in the transverse direction of the real position of the ring;

the matrix image of the left edge in order to determine the coordinates in the transverse and vertical directions of a left positioning point; and the matrix image of the right edge in order to determine the coordinates in the transverse and vertical directions of a right positioning point;

take account of the real height of the container;

determine at least the coordinate in the transverse direction of a theoretical position of the ring on a perpendicular to the straight line segment passing through the left and right positioning points at the real height of the container taken from the straight line segment; and analyze the coordinates of the real position of the ring and the theoretical position of the ring taken into consideration during at least half a revolution of the container, in order to deduce a measurement of the lean for the container from the variations in the differences of their positions.

Furthermore, the device of the invention also comprises in combination at least one and/or another of the following additional characteristics:

a linear camera having its array placed in a plane perpendicular to the axis of rotation and intersecting the ring of the container beneath its top, so as to act, for each increment in rotation, to transmit to the analysis unit a horizontal section of the ring in which the two edges of the ring are distinguished;

a matrix camera having its optical observation axis pass close to the vertical axis of the article and under or including the top of the ring so as to act, for each increment in rotation, to transmit to the analysis unit a matrix image of the ring;

a matrix camera having its optical observation axis pass close to the vertical axis of the container and above the bottom of the container so that the left and right heels are constantly in its field of observation so as to act, for each increment in rotation to transmit to the analysis unit a matrix image of both heels;

an optical device, e.g. a catoptric and/or a prismatic optical device installed between the camera observing the bottom and the article being inspected, so as to optimize the field, said device possibly being made to be adjustable in order to adapt to the diameter of the container; and two synchronous matrix cameras having respective optical observation axes that are orthogonal to the vertical axis of the container and above the bottom of the container, the field of the first camera covering solely the right field, the field of the other camera covering solely the left field, so as to act, for each increment in rotation, to transmit to the analysis unit a matrix image of each heel.

Various other characteristics appear from the description made below with reference to the accompanying drawings, which show embodiments of the invention as non-limiting examples.

Figure 1:
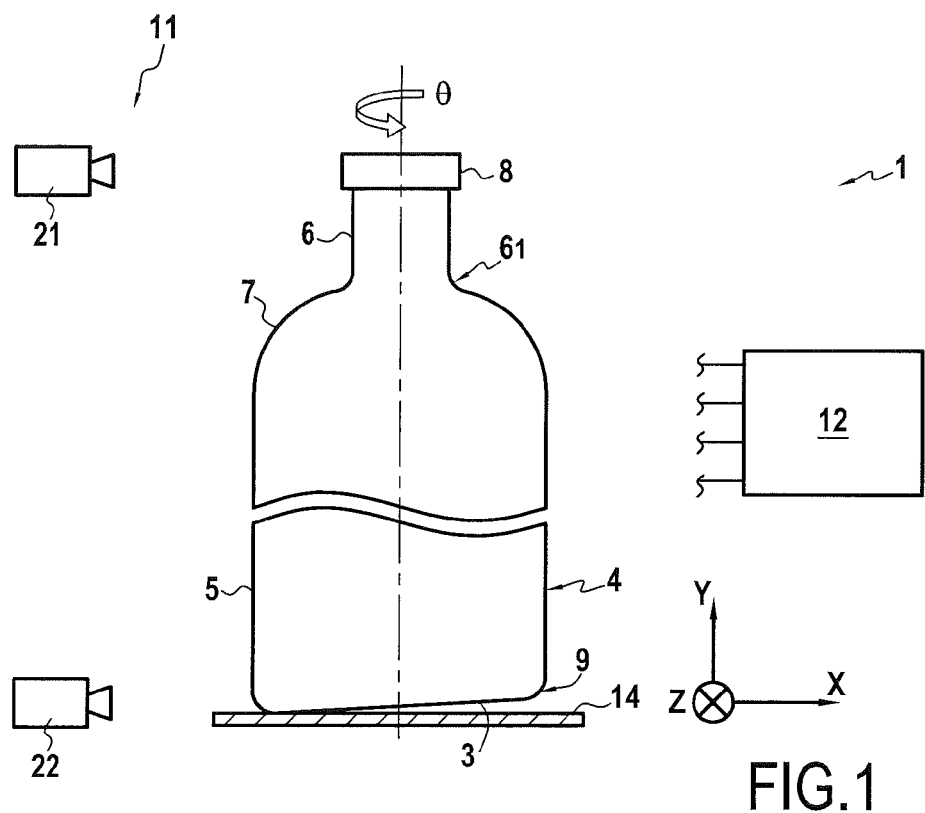
FIG. 1 is a diagrammatic view in elevation showing an embodiment of a vision device in accordance with the invention.
Figure 2:
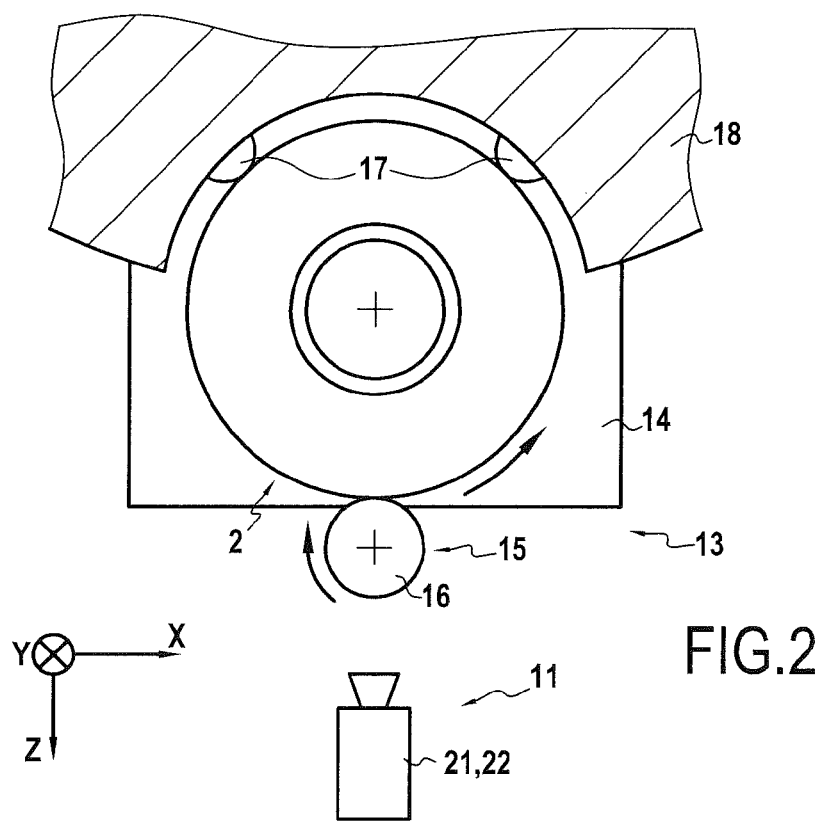
FIG. 2 is a plan view showing an example of a container being driven in rotation while its lean is being measured by the vision device in accordance with the invention.

As can be seen more particularly in FIGS. 1 and 2, the invention relates to a device 1 for measuring the lean of containers 2, e.g. containers made of glass, such as bottles. In conventional manner, each container 2 presents a bottom 3 from which there rises a vertical wall 4. For a container of the bottle type, on going away from the bottom 3, the vertical wall 4 presents a portion 5 forming the body of the bottle that connects with a neck 6 via a shoulder 7. The neck 6, on going away from its base $6_1$ where it connects with the shoulder 7, presents a portion referred to as a ring or mouth 8. At its opposite end, the body 5 of the container 2 connects with the bottom 3 via a heel or insweep 9.

The detector device 1 comprises a vision system 11 connected to an analysis and processor unit 12 for determining a measurement of the lean of containers 2.

The lean of a container 2 is measured when the container 2 is caused to revolve (through an angle θ) about a vertical axis Y for at least half a revolution. In this respect, each container 2 is taken in charge by a drive system 13. For example, the drive system 13 has a sliding or support surface 14 for the bottom 3 of the container 2 and a rotary drive system 15 having a rotary drive wheel (or turner 16) for driving the container, which container has its body 5 pressed against two abutments 17. By way of example, these abutments 17 form parts of a handling star 18 for bringing containers 2 in succession up to the vision system 11.

Each container 2 remains in front of the detector system 1 for the time needed to allow it to revolve through half a revolution while measurements are made in the manner explained below in the description. The drive and rotary drive systems 13 and 15 are not described in greater detail since they do not form part of the subject matter of the invention and they are well known to the person skilled in the art. It should be considered that the rotary drive system 15 is not capable of placing the containers 2 in a reproducible fixed position relative to the detector device 1, and in particular on the sliding surface 14. Thus, as shown in FIG. 1, the bottom 3 of the container need not press entirely on the sliding surface 14 while the container is rotating.

Figure 3:
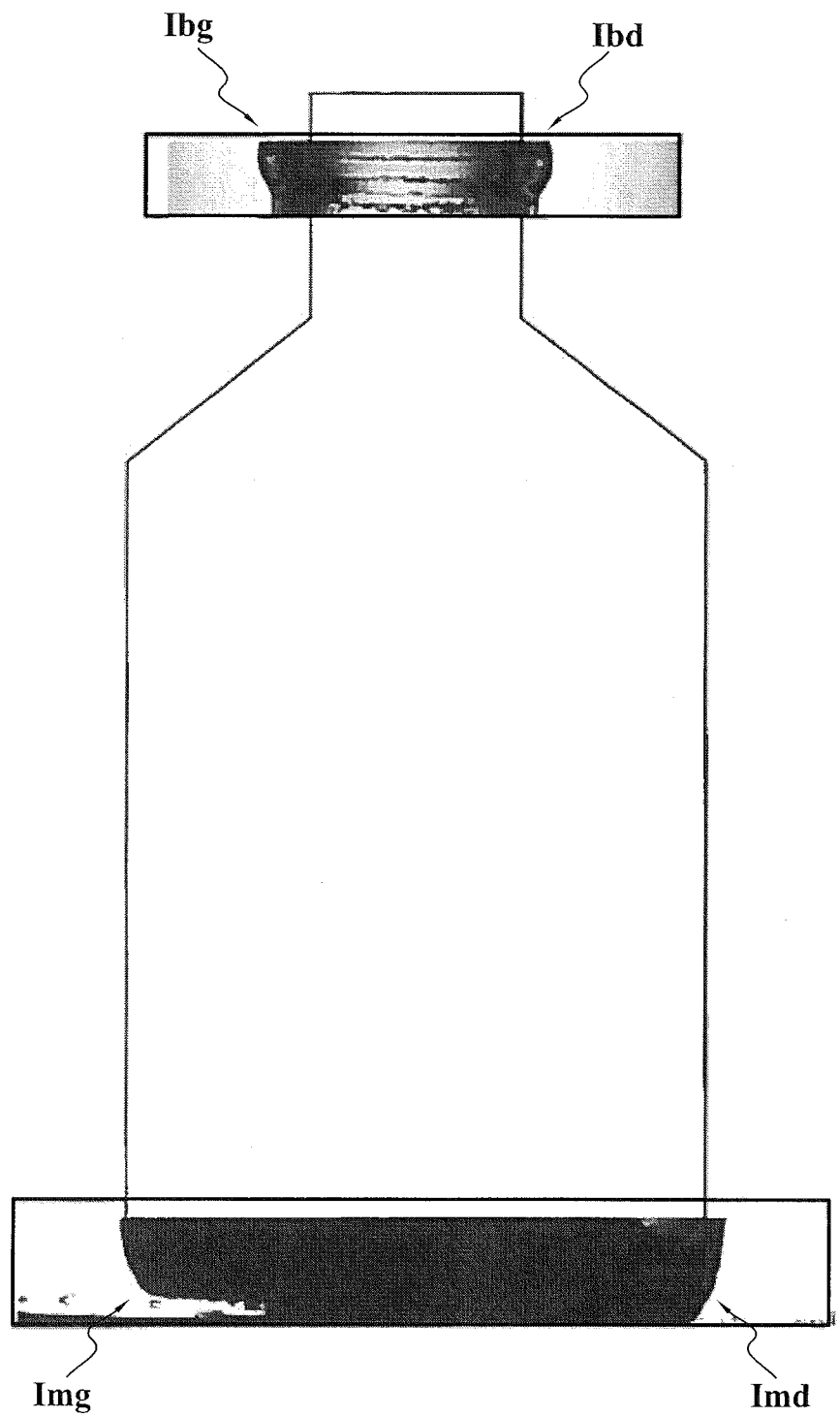
FIG. 3 is a diagram showing an example of images taken of the ring and of the insweep of a container.

The vision system 11 has at least one camera, and in the example shown in FIGS. 1 and 2 it has a first camera 21 connected to the analysis and processor unit 12 and adapted to take images of the container 2 in such a manner as to obtain at least an image Ibg of the left edge of the ring 8, and at least an image Ibd of the right edge of the ring 8. The camera 21 possesses an optical observation axis Z that is substantially orthogonal to the vertical axis Y of the container 2 and that presents a lateral field extending in a transverse direction X that is orthogonal to the vertical axis Y and to the optical axis Z. In an embodiment, this first camera is a linear camera having an array that is placed in a plane perpendicular to the axis of rotation and intersecting the ring 8 of the container below its top, so as to transmit a horizontal section of the ring to the analysis unit 12 for each increment in rotation, which section shows the two edges of the ring, referred to as the left edge and the right edge with reference to their positions as they appear in each of the images taken by the camera (FIG. 3). The terms "left" and "right" are thus given from the point of view of an observer of each image, since properly speaking a rotating container does not have a left side or a right side.

In the variant embodiment shown in FIG. 3, the device has a first camera 21, which is a matrix camera, with its optical observation axis Z passing close to the vertical axis Y of the container 2 so as to cover both sides of the container and, for each increment in rotation, so as to transmit a single matrix image of the ring to the processor and analysis unit 12, which matrix image includes the images Ibg and Ibd of the left and right edges of the ring 8. It should be observed that observing both sides of the ring by means of two cameras is also possible, but presents no technical or economic advantage.

The vision device 11 of the invention also has at least one second camera 22 connected to the processor and analysis unit 12 and adapted to make images of the container 2 so as to obtain a matrix image of the left and right edges of a zone of interest of the container that is moving quickly in the observation plane defined by the vertical axis Y and the transverse axis X. Thus, the matrix camera 22 takes as zones of interest both a left matrix image Img of the heel 9, of the shoulder 7, and/or of the base $6_1$ of the neck of the container, and a right matrix image Imd of the heel 9, of the shoulder 7, and/or of the base $6_1$ of the neck of the container.

In the example shown in the drawings, the vision device 11 comprises a matrix camera 22 having its optical observation axis Z passing close to the vertical axis Y of the container and including the bottom 3 of the container so that both the right and left heels 9 are constantly in its field of observation, thereby enabling a matrix image of both heels to be transmitted to the processor and analysis unit 2 for each increment in rotation.

Naturally, in this variant embodiment, the two cameras 21 and 22 are synchronous. It is possible to envisage using a second matrix camera 22, i.e. three cameras in all, such that the field of the first matrix camera includes only the right heel, the right shoulder, and the right base of the neck of the container, while the second matrix camera sees only the left heel, the left shoulder, or the left ring of the neck of the container so as to transmit left and right matrix images of heel, of the shoulder, or of the base of the neck of the container to the analysis unit 12 for each increment in rotation. It should be observed that the two matrix cameras need not necessarily be arranged so as to take images of two zones of interest of the container that are arranged symmetrically on opposite sides of the container.

In another variant embodiment, provision may be made to use a single matrix camera observing the container 2 in order to provide images Ibg, Ibd of the left and right edges of the ring and matrix images Img, Imd of the left and right edges of the insweep, of the shoulder, and/or of the base of the neck.

It should be observed that taking images Ibg, Ibd of the left and right edges of the ring 8 in combination with matrix images Img, Imd of the left and right heels makes it possible to measure the lean of the container 2, i.e. the total lean of the container.

It should be observed that the matrix camera(s) 22 may be adapted to take left and right matrix images of the shoulder or of the base $6_1$ of the neck 6 of the container in such a manner as to make it possible:

in combination with taking images Ibg, Ibd of the left and right edges of the ring, to measure the lean of the neck 6 of the container; and/or in combination with taking left and right matrix images Img, Imd of the heel, to measure the lean of the body 5 of the container.

Thus, the device 1 of the invention is adapted to measure the total lean of the container and/or of the neck of the container and/or of the body of the container. The description below relates to measuring the total lean of the container, however it is clear that the person skilled in the art can adapt the description of the invention to measuring the lean of the body or of the neck of the container 2.

In an advantageous embodiment, the device 1 has an optical device, e.g. a catoptric and/or prismatic device installed between the camera 22 observing the bottom and the inspected container so as to optimize the field, said device potentially being made to be adjustable in order to adapt it to the diameter of the container.

Likewise, it is possible to envisage interposing at least one optical device between the container 2 and one and/or the other of the cameras 21 and 22 so as to impart telecentric observation to the camera. Such an optical device with telecentric observation may be used on its own or in combination with the catoptric and/or prismatic optical device.

Naturally, the device of the invention includes one or more lighting sources of any type so as to enable the cameras to take images suitable for analysis. For example a uniform backlight source situated on the side of the article opposite from the camera constitutes a solution that is well known to the person skilled in the art for checking dimensions by means of vision systems.

By way of example, when the camera 21 is of the linear type, it is possible to use a system such as a "profile measurer" or micrometer as sold under the name "Keyence LS7000". For lighting, such systems use a source that supplies a parallel beam in the form of a plane sheet, often of the laser type. The sensor then makes it possible to measure the dimensions and the positions of the portions of the light sheet that are occulted, without necessarily having a conventional objective lens in the front of the camera.

The cameras 21 and 22 are controlled by the analysis and processor unit 12 so that over at least half a revolution of the container 2 and for each increment in rotation of the container 2, the cameras can take the left edge image Ibg of the ring, the right edge image Ibd of the ring, and the matrix images Img and Imd of the left and right heels, of the left and right shoulders, and/or matrix images of the left and right bases of the neck of the container 2.

For each increment in rotation of the container 2, the processor unit 12 analyzes the left edge image Ibd of the ring 8 and the right edge image Ibd of the ring 8 in order to determine at least the coordinate XCr in the transverse position of the real position Cr of the ring 8.

Figure 4:
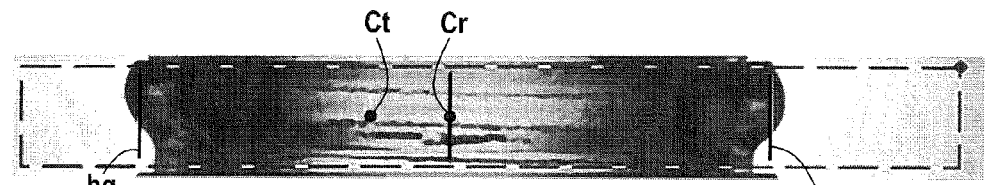
FIG. 4 shows an image of a ring in which there can be seen the real position Cr of the ring and the theoretical position Ct of the ring.

The processor and analysis unit 12 determines the transverse position of the real position of the ring 8 by analyzing the images Ibg and Ibd in such a manner as to determine the respective positions of the left edge bg and of the ring 8 and of the right edge bd of the ring 8 (FIG. 4). Starting from the positions along the axis X of the right and left edges bg and bd, the real position Cr of the ring 8 is determined as being at a point that depends on these left and right edges. For example, the midpoint between the respective positions of the right and left edges bg and bd is selected to correspond to the real position Cr of the ring 8. It should be observed that the coordinate XCr of the position along the transverse axis of the real position Cr of the ring 8 may be selected arbitrarily relative to the coordinates along the transverse axis of the left and right edges bg and bd.

Figure 5:
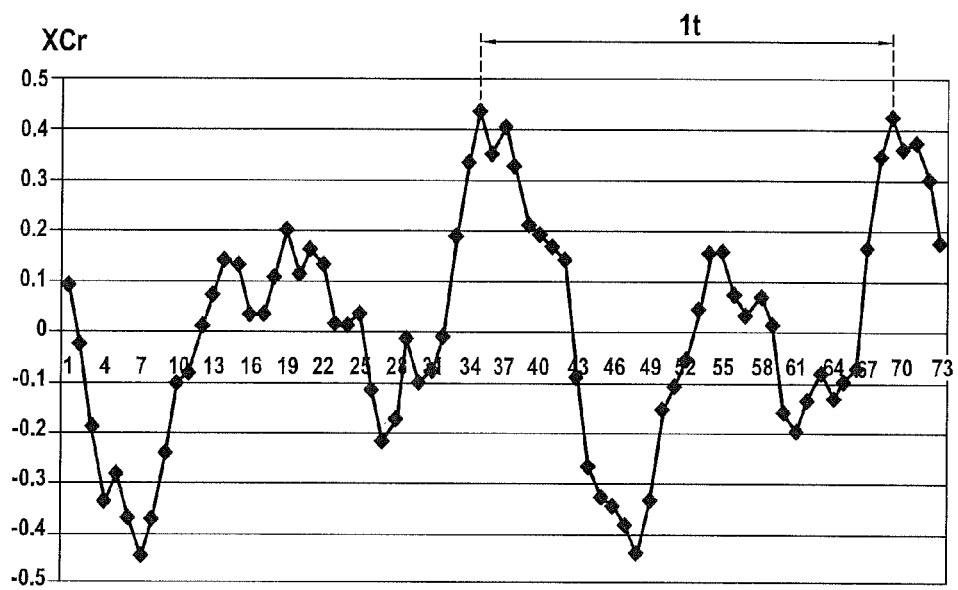
FIG. 5 is a curve showing how the real position Cr of the ring moves sideways XCr during at least one revolution of the container.

FIG. 5 shows the lateral movement XCr along the transverse axis X of the real position Cr of the ring during at least one revolution of the container 2.

Likewise, the processor unit 12 acts for each increment in rotation of the container 2 to analyze the matrix image Img of the left edge in order to determine the coordinates XTg and YTg in the transverse and vertical directions X and Y of a left positioning point Tg, and the matrix image of the right edge Imd in order to determine the coordinates XTd and YTd in the transverse and vertical directions X and Y of a right positioning point Td.

In general manner, it should be considered that the left and right positioning points Tg and Td constitute reference or identification points for the left and right positions respectively of the container. The positioning points Td and Tg may be selected in arbitrary manner relative to the left and right edges of the container 2. It should be observed that determining the left and right positioning points Tg and Td on the basis of their coordinates along the two directions X and Y gives good accuracy to the measurement.

In an advantageous variant embodiment, the device determines the left and right positioning points Tg and Td in the initial image by selecting them so that they are located in the support surface.

Figure 6:
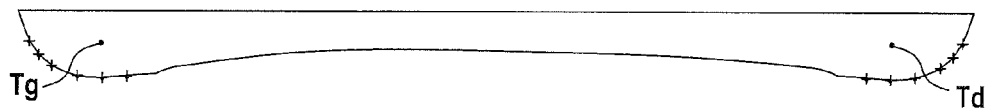
FIG. 6 is a view showing the insweep of a container associated with left and right positioning points Tg and Td.

In another variant embodiment, the left and right positioning points Tg and Td are selected so as to be symmetrical about the axis of symmetry Y of the container, so that they are spaced apart by a distance substantially equal to the diameter of the support surface or of the container 2 (FIG. 6).

In a preferred embodiment, the processor and analysis unit 12 determines the left and right positioning points Tg and Td as follows.

For each container 2, the initial positions and shapes of the left edge and of the right edge of the container are determined in the first left and right matrix images Img and Imd. Thereafter, in each following left and right matrix image Img and Imd, the processor and analysis unit 12 looks for the shape of the left and right edges respectively of the container as characterized in the first image in order to determine the left and right positioning points Tg and Td.

Figure 7:
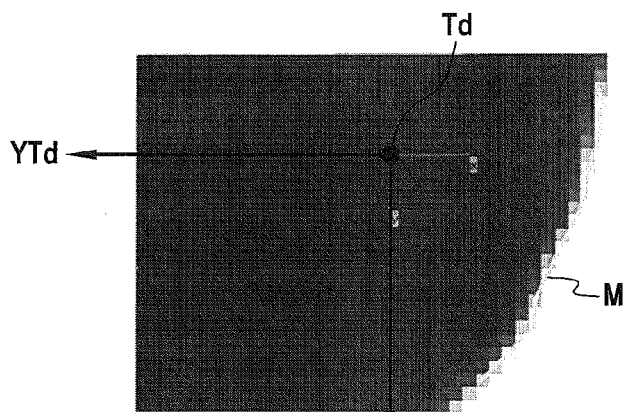
FIG. 7 is a view on a large scale of the image of the right heel of a container that is associated with a positioning point Td.

Advantageously, the shapes of the left and right edges of the container are characterized in the matrix images by least the outline M of the container as it appears in the matrix image (FIG. 7). The outline M is described by a set of points and/or of segments and/or of curved portions. It should be observed that the shape of the container in the images may be characterized by all or part of the outline M and/or by all or part of the image associated with the outline M.

Figure 9:
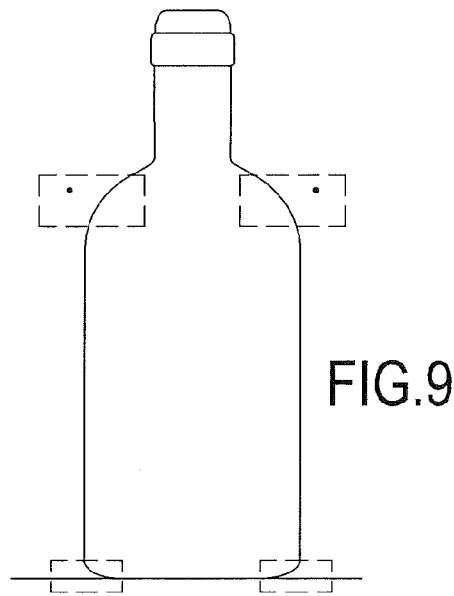
FIGS. 9 and 10 are views of two successive images explaining the principle of the invention.
Figure 10:
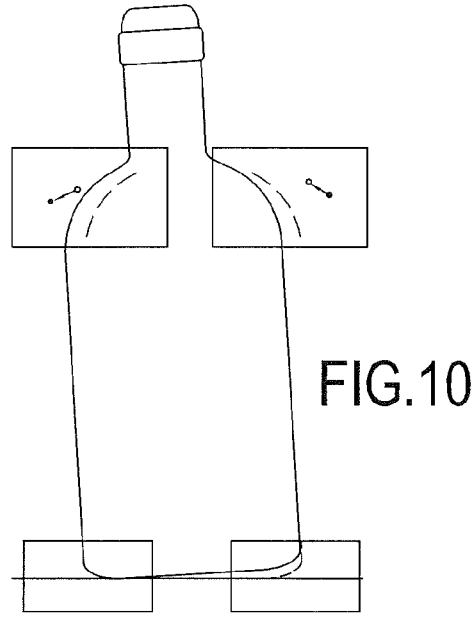

Thus, the processor and analysis unit 12 looks for the outline M of the container as characterized in the first matrix image in each of the following images by seeking to superpose said outline M with the outline present in each following image by performing operations in translation and/or in rotation (FIGS. 9 and 10). The superposition operation may also make use of any other pattern matching method seeking to superpose a portion of one image with a portion of another image.

Figure 8:
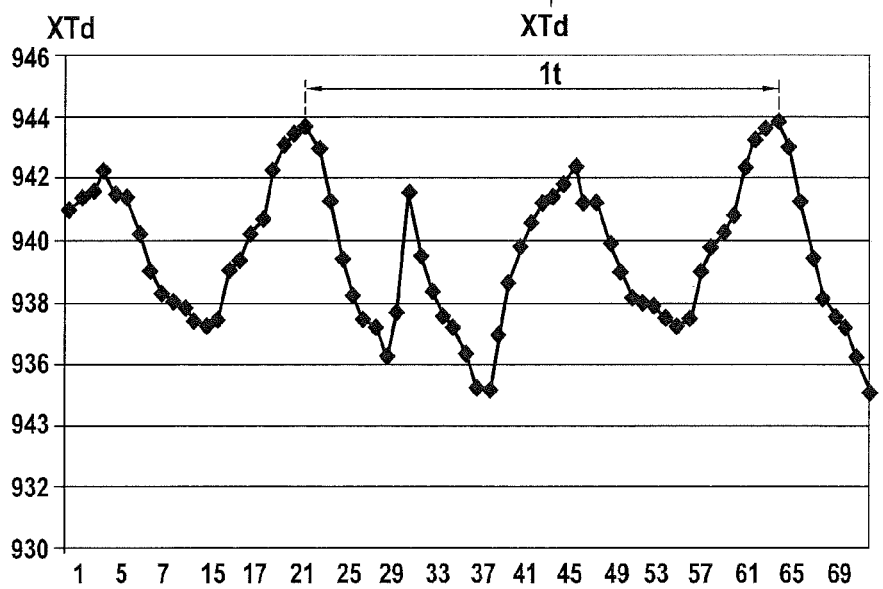
FIG. 8 is a curve showing the sideways movement, i.e. the variations in the coordinate XTd, of the right positioning point Td of the right insweep during at least one revolution of the container.

Superposing outlines (or image portions) present in each following image relative to the outline (or image portion) characterized in the first image makes it possible, for each of the images, to determine the positions of the left and right positioning points Tg and Td. FIG. 8 shows an example of the coordinate XTd along the transverse axis X of the right positioning point Td during rotation of the container 2 through at least one revolution.

Figure 11:
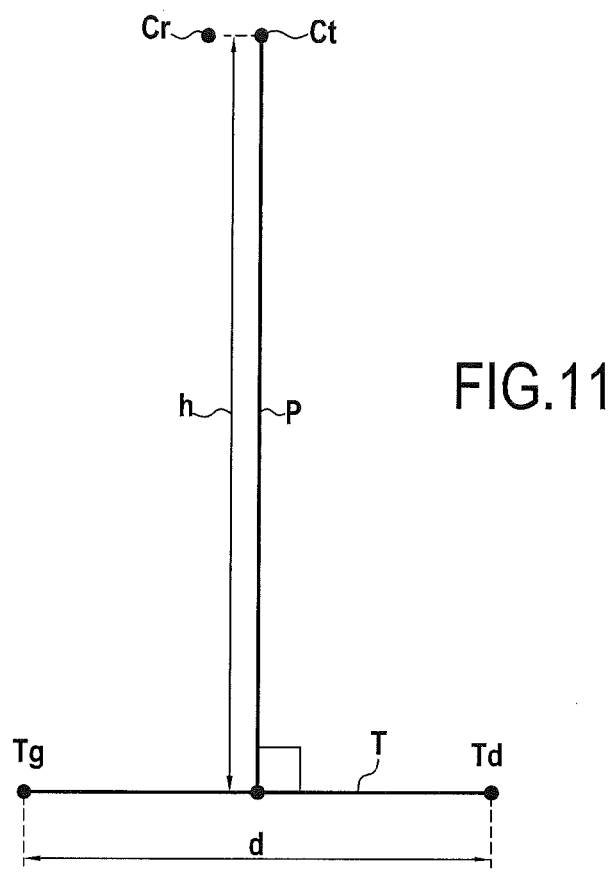
FIG. 11 is a diagram showing the measurement principle in accordance with the invention.

For each increment in rotation of the container 2, the processor 12 determines at least the coordinate XCt in the transverse direction of an expected or "theoretical" position Ct on a perpendicular P to the straight line segment T passing through the left and right positioning points Tg and Td at a determined distance h from the straight line segment T (FIG. 11). It must be understood that the variations in the coordinate XCt of the theoretical position Ct of the ring depend on variations in the position of the bottom of the container and consequently on the attitude of the container 2.

The distance h corresponds to the real height of the container. This height h of the real position of the ring relative to the straight line segment T is defined for each type of container 2 or for each container 2 on the basis of a measurement or of a selected constant. This height, which may for example be stored, is taken into account by the processor unit 12 during the processing.

Naturally, the perpendicular P is taken at the same location on the straight line segment T for all of the matrix images corresponding to each increment in rotation of the container 2. For example, the perpendicular P is taken at the center of the two positioning points Tg and Td.

The theoretical position Ct of the ring is compared relative to the real position Cr of the ring as determined from the images Ibg and Ibd of the ring.

The processor unit 12 analyzes variations in the transverse direction X of the coordinates of the real position Cr of the ring and of the theoretical position Ct of the ring as taken into consideration during at least half a revolution of the container so as to deduce from the variation in the differences in their positions a measurement for the lean of the container.

In the preferred variant embodiment, for each increment in rotation θ of the container 2, the coordinates XCt in the transverse direction X of the theoretical position Ct is given by the following formula:

$$X_{Ct}(\theta) = \frac{h}{d}\left(\frac{XTd(\theta) + XTg(\theta)}{2}\right)$$

For each increment in rotation θ of the container 2, the difference ΔX is calculated between the coordinate XCr in the transverse direction X of the real position Cr of the ring and the coordinate XCt in the transverse direction X of the coordinate of the theoretical position Ct of the ring. This may be expressed as follows:

$$\Delta X(\theta) = X_{Cr}(\theta) - X_{Ct}(\theta)$$

For at least half a revolution of the container 2, the variation in the ΔX is analyzed in order to deduce a measurement of lean therefrom. This may be done as follows:

$$V = \max[\Delta X(\theta)] - \min[\Delta X(\theta)], \text{ or } V = \max_{\theta}[\Delta X(\theta)] - \min_{\theta}[\Delta X(\theta)]$$

where V is the value of the lean.

Figure 12:
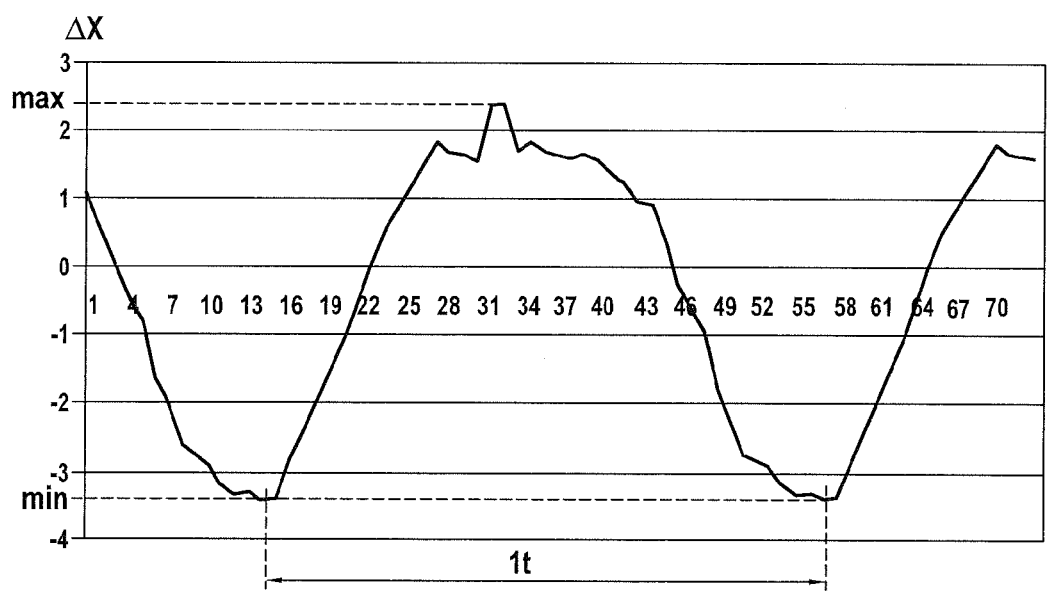
FIG. 12 is a curve showing the difference between the measured position of the ring and the expected position for the ring of the container over at least one revolution of the container.

As can be seen in FIG. 12, the measured lean is equal to the amplitude of the curve or pseudo-sinewave showing the differences over at least half a revolution of the container and in the transverse direction X relating to the real position Cr of the ring and the theoretical position Ct of the ring. In other words, the measurement for lean is deduced from the difference between the minimum values (min in FIG. 12) and the maximum values (max in FIG. 12) for the difference ΔX between the coordinates of the real and theoretical positions of the ring. Thus, if the differences ΔX between the coordinates of the real and theoretical positions remain constant, then lean is ideal (even if the difference ΔX is not zero).

Naturally, in order to be certain to observe the maximum and minimum values (max and min) of the difference ΔX, it can be seen that it is necessary to take account of values of turning through considerably more than half a revolution, and ideally analysis should be undertaken for one complete revolution t.

In another variant embodiment, it may be advantageous to improve accuracy by taking account of the coordinates in the vertical direction Y of the theoretical position Ct of the ring and of the real position Cr of the ring. In this method, in the images of the left edge and of the right edge of the ring, it is appropriate to take account also of the top of the ring, e.g. by using a pattern matching method.

The vision device in accordance with the invention is used in a manner that stems directly from the above description. Thus, the method consists in:

for each increment in rotation θ of the container 2 over at least half a revolution;
  taking at least one image of the container so as to obtain the left edge image Ibg of the ring, the right edge image Ibd of the ring, the matrix image Img of the left edge of the heel, of the shoulder, and/or of the base of the neck, and the matrix image Imd of the right edge of the heel, of the shoulder, and/or of the base of the neck;
  analyzing:
    the images of the left and right edges of the ring in order to determine at least the coordinate in the transverse direction of the real position Cr of the ring;
    the matrix image Img of the left edge in order to determine the coordinates along the transverse and vertical directions of a left positioning point Tg (XTg, YTg); and
    the matrix image Imd of the right edge in order to determine the coordinates in the transverse and vertical directions of a right positioning point Td (XTd, Ytd); and
  determining at least the coordinate in the transverse direction of a theoretical position Ct of the ring on a perpendicular P to the straight line segment T passing through the left and right positioning points Tg and Td, at a determined distance from the segment; and
  on the basis of the coordinates of the real position Cr of the ring and of the theoretical position Ct of the ring, taken over at least half a revolution of the container, deducing a measurement of the lean of the container from the variations in the difference between their positions.

The invention is not limited to the examples described and shown since various modification may be applied thereto without going beyond the ambit of the invention.

The invention claimed is:

1. A method of measuring lean on a container (2) standing on a support surface and presenting a ring (8) and a bottom (3) from which their rises a vertical wall (4) connected to the bottom by a heel (9), the vertical wall (4) presenting a neck that is optionally provided at its base with a shoulder, and the method consisting in:
  causing the container (2) to revolve about a vertical axis (Y) close to the axis of symmetry of the article;
  placing at least one camera on one side of the container to deliver a sequence of images of the container over at least half a revolution, the camera having at optical observation axis (Z) that is substantially orthogonal to the vertical axis (Y) of the container, with a lateral field that extends in a transverse direction (X) orthogonal to the vertical axis (Y) and to the optical axis (Z);
  the method being characterized by the following steps:
  defining a real height (h) for the container;
  for each increment in rotation (θ) of the container (2) through at least half a revolution:
    taking at least one image of the container so as to obtain an image (Ibg) of the left edge of the ring, an image (Ibd) of the right edge of the ring, a matrix image (Img) of the left edge of one or more of the heel, of the shoulder, and of the base of the neck, and a matrix image (Imd) of the right edge of one or more of the heel, of the shoulder, and of the base of the neck;
  analyzing:
    the images of the left and right edges of the ring in order to determine at least the coordinate in the transverse direction of the real position (Cr) of the ring;
    the matrix image of the left edge in order to determine the coordinates in the transverse and vertical directions of a left positioning point Tg (XTg, YTg); and
    the matrix image of the right edge in order to determine the coordinates in the transverse and vertical directions of a right positioning point Td (XTd, YTd); and
  defining at least the coordinate in the transverse direction of a theoretical position (Ct) of the ring on a perpendicular (P) to the straight line segment (T) passing through the left and right positioning points (Tg, Td) at the real height (h) of the container taken from this straight line segment (T); and
  on the basis of the coordinates of the real position (Cr) of the ring and of the theoretical position (Ct) of the ring, taken on at least half a revolution of the container, deducing a measurement for the lean of the container from the variations in the differences of their positions.

2. A method according to claim 1, characterized in that it consists in taking as left and right matrix images, matrix images of one or more of the heel, of the shoulder, and of the base of the neck in order to measure one or more of the lean of the neck of the container, of the body of the container, and a total lean thereof.

3. A method according to claim 1, characterized in that for each increment in rotation, the real position (Cr) of the ring is determined by analyzing a linear or matrix image containing the entire ring in the transverse direction, in determining the respective positions of the right and left edges of the ring, and by calculating a point that depends on the two edges.

4. A method according to claim 1, characterized in that, for each container, it consists in:
  characterizing the initial positions and shapes of the left and right edges of the container in the left and right matrix images respectively taken during rotation of the container; and
  searching, respectively in each of the following left and right matrix images taken during rotation of the container for the shapes respectively of the left and right edges of the container as characterized in the first image in order to determine the left and right positioning points.

5. A method according to claim 4, characterized in that it consists in determining the left and right positioning points in the initial image by selecting them to be symmetrical about the axis of symmetry of the container, and by spacing them apart at a distance of the same order as the diameter of the support surface or of the container.

6. A method according to claim 5, characterized in that it consists in determining the left and right positioning points in the initial image by selecting them so as to situate them in the support surface.

7. A method according to claim 3, characterized in that it consists in characterizing the shape of the right and left edges of the container by at least the outlines of the container that appear in the matrix image as described by sets of one or more of points, and of segments, and curved portions, and in that it consists in searching at least for the outline characterized in the first image in each of the following images, by attempting to superpose at least said outline on the outline present in each following image by using operations of one or both of translation and of rotation.

8. A method according to claim 1, characterized in that, for each type of container, it consists in determining the distance (h) of the theoretical position (Ct) of the ring relative to the straight line segment from a determined constant or measurement.

9. A method according to claim 1, characterized in that it consists in taking a left edge image and a right edge image including viewing the top edge of the container in order to determine the height of the container.

10. A device for measuring lean of a container (2) presenting a ring (8) and a bottom (3) from which there rises a vertical wall (4) connected to the bottom by a heel (9), the vertical wall (4) presenting a neck that is optionally provided at its base with a shoulder, the device comprising:
  a system for causing the container (2) to revolve about its vertical axis of symmetry (Y);
  at least one camera arranged on one side of the container and delivering sequences of images of the container over at least half a revolution, and having an optical observation axis (Z) that is substantially orthogonal to the axis of rotation (Y) of the container, with a lateral field that extends in a direction (X) orthogonal to the vertical axis of symmetry (Y) of the optical axis (Z);
  a storage unit for storing image sequences of containers; and
  a unit for analyzing images and image sequences supplied at least by the camera, and connected to the storage unit;
the device being characterized in that:
for each increment in angle ($\theta$) at least one camera takes at least one image of the left and right edges (Ibg, Ibd) of the ring, the left matrix image (Img) of one or more of the heel, of the shoulder, and to the base of the neck, and the right matrix image (Imd) of one or more of the heel, of the shoulder, and of the base of the neck of the article;
the processor unit serves to:
  analyze:
    the images (Ibg, Ibd) of the left and right edges of the ring in order to determine at least the coordinate in the transverse direction (X) of the real position (Cr) of the ring;
    the matrix image (Img) of the left edge in order to determine the coordinates in the transverse and vertical directions (X, Y) of a left positioning point Tg (XTg, YTg); and
    the matrix image (Imd) of the right edge in order to determine the coordinates in the transverse and vertical directions (X, Y) of a right positioning point Td (XTd, YTd);
  take account of the real height (h) of the container;
  determine at least the coordinate in the transverse direction of a theoretical position (Ct) of the ring on a perpendicular (P) to the straight line segment (T) passing through the left and right positioning points at the real height (h) of the container taken from the straight line segment (T); and
  analyze the coordinates of the real position (Cr) of the ring and the theoretical position (Ct) of the ring taken into consideration during at least half a revolution of the container, in order to deduce a measurement of the lean for the container from the variations in the differences of their positions.

11. A device according to claim 10, characterized in that it includes a linear camera (21) having its array placed in a plane perpendicular to the axis of rotation and intersecting the ring of the container beneath its top, so as to act, for each increment in rotation, to transmit to the unit for analyzing a horizontal section of the ring in which the two edges of the ring are distinguished.

12. A device according to claim 10, characterized in that it includes a matrix camera (21) having its optical observation axis pass close to the vertical axis of the article and under or including the top of the ring so as to act for each increment in rotation, to transmit to the unit for analyzing a matrix image of the ring.

13. A device according to claim 10, characterized in that it includes a matrix camera (21) having its optical observation axis pass close to the vertical axis of the container and above the bottom of the container so that the left and right heels are constantly in its field of observation so as to act, for each increment in rotation, to transmit to the unit for analyzing a matrix image of both heels.

14. A device according to claim 10, characterized in that it includes an optical device installed between the camera observing the bottom and the article being inspected, so as to optimize the field, said device possibly being made to be adjustable in order to adapt to the diameter of the container.

15. A device according to claim 9, characterized in that it includes two synchronous matrix cameras having respective optical observation axes that are orthogonal to the vertical axis of the container and above the bottom of the container, the field of the first camera covering solely the right field, the field of the other camera covering solely the left field, so as to act, for each increment in rotation, to transmit to the unit for analyzing a matrix image of each heel.

16. A device according to claim 14, wherein the optical device is one of a catoptric and a prismatic optical device.

* * * * *